R. H. DOLPH.
CLUTCH.
APPLICATION FILED MAY 23, 1911.

1,010,128.

Patented Nov. 28, 1911.

Witnesses:
Patrick D. Walsh
Hilda A. Lundberg

Inventor:
Raymond H. Dolph.
By his Attorney, Oscar A. Perrigo

UNITED STATES PATENT OFFICE.

RAYMOND H. DOLPH, OF GUILFORD, CONNECTICUT.

CLUTCH.

1,010,128.   Specification of Letters Patent.   Patented Nov. 28, 1911.

Application filed May 23, 1911. Serial No. 629,058.

*To all whom it may concern:*

Be it known that I, RAYMOND H. DOLPH, a citizen of the United States, residing at Guilford, in the county of New Haven and State of Connecticut, have invented a new and useful Improvement in Clutches, of which the following is a specification.

My invention relates to improvements in clutches used to transmit motion from one shaft, pulley, gear, or other revolving piece of machinery to another revolving part, and to connect or disconnect these parts at will; and the object of my improvement is to connect such revolving part to the member which is at rest in such a manner as to transmit the motion of the revolving part gradually to the member at rest, and with an accelerating degree of speed until the speeds of both members are equal, and then to rigidly lock these two members to each other; and unlock and gradually bring the second member to rest; all without undue shock or strain to the several parts of the device or to the revolving member or to the member to which motion is to be transmitted. I accomplish these objects by means of the mechanism illustrated in the accompanying drawing, in which—

Figure 1:
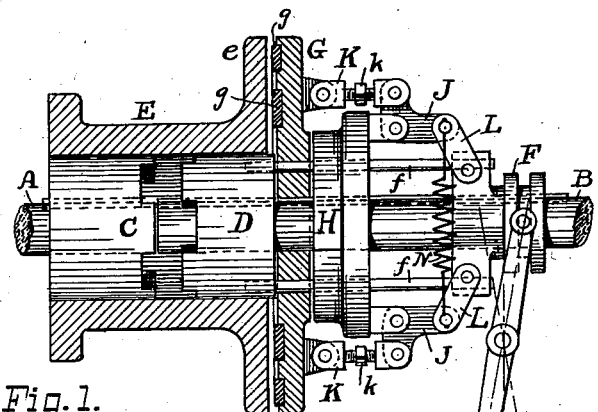
Figure 2:
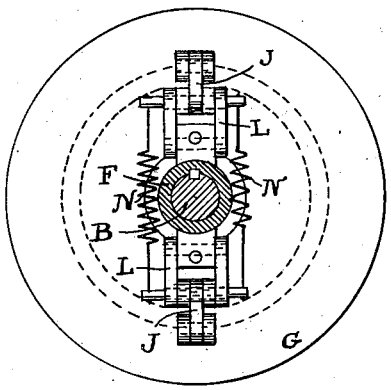
Figure 3:
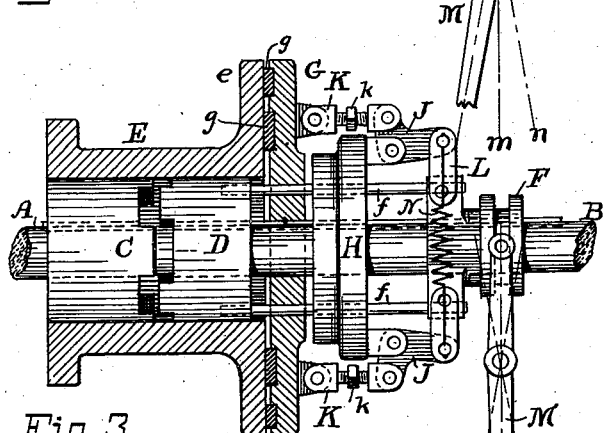
Figure 4:
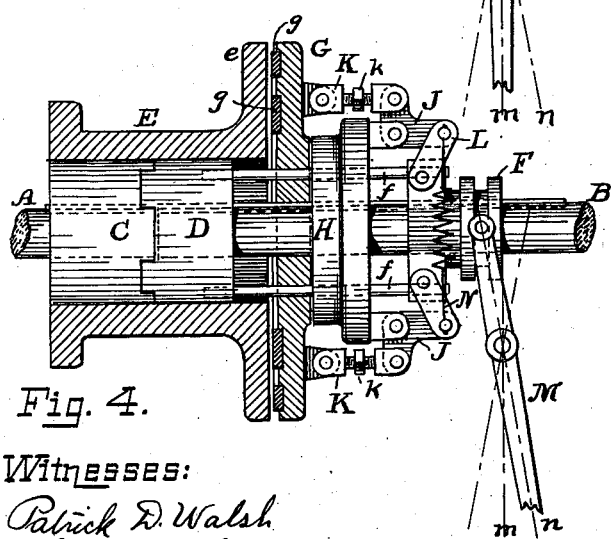

Figure 1 is a longitudinal section of my device, and Fig. 2 is an end elevation, showing the several parts when the driving member is in motion and the driven member is at rest; Fig. 3 is a longitudinal section when the several parts are in the proper position to transmit motion from the driving to the driven member by means of frictional contact; and Fig. 4, is a longitudinal section when the parts connecting the driving and the driven member are rigidly locked to each other.

Similar letters refer to similar parts in the several views.

A is the driving shaft and B the driven shaft, their ends meeting between the two clutch members C and D, as usual. The clutch member C is fixed to the driving shaft A, and has fixed upon it the cylindrical piece E, which has formed upon it the friction flange e. The friction flange e may be formed integral with the fixed clutch member C. These are here shown in two parts for convenience of manufacture. Sliding within the bore of the part E and upon the splined shaft B is the opposite clutch member D, which is connected to the sliding shipper lever collar F by means of the rods f f, fixed at either end to the parts D and F. Sliding upon the splined shaft B is the friction disk G, which has recessed into its face the friction rings g g, adapted to be brought in contact with the face of the friction flange e. Fixed to the shaft B is the disk H, adapted to support and retain in proper position the movable parts of the mechanism. The connecting rods f f slide loosely through the disks G and H.

Pivoted in suitable lugs on the disk H are the right angle levers J J. The short ends of these levers are connected with the friction disk G by the links K K which are rendered adjustable by the right and left screws k k. The long ends of the right angle levers J J are connected with the shipper lever collar F by the links L L pivoted to suitable lugs formed upon it. The shipper lever collar F is operated by the shipper lever M. By means of this mechanism the friction disk G is moved to and from the flange e and simultaneously the sliding clutch D is moved to and from the fixed clutch member C. The closed spiral springs N N are adapted to draw the outer ends of the right angle levers J J together for the purpose of preventing contact of the friction disks except when such contact is desired.

In the drawing only two sets of right angle levers are shown. These would be sufficient for a comparatively small clutch. For larger sizes, required to transmit more power, there would be from three to six sets of these parts, disposed at equal intervals around the circle.

The operation of my device is as follows: The various parts of the mechanism being in the position shown in Fig. 1, the shaft A is revolving while the shaft B is at rest. It being desired to communicate motion to the shaft B, the shipper lever M is moved to the central position m, as shown in Fig. 2. By this movement, acting through the right angle levers J J and their connections, the friction disk G is forced into contact with the flange e and the rotary motion of the shaft A gradually communicated to the shaft B. While this movement has brought the clutch members C D nearer to each other they are not in contact. When the shaft B has attained the maximum speed and it is desired to positively lock the clutch, the shipper lever is moved to the position n, thus bringing into contact and positively locking the clutch members C and D. Simultaneously, by the action of the right angle levers J J and their connections, the friction disk G is withdrawn from contact with the flange e, and power transmitted only by the locked clutch members C and D. (See Fig. 3.) It being desired to gradually stop the rotation of the shaft B the above described movements of the parts are reversed, first unlocking the clutch members C and D and throwing the friction disk G and the flange e in contact, and continuing the movement of the shipper lever M, withdrawing this frictional contact and bringing the shaft B gradually to rest.

It will readily be seen that by the use of my mechanism on very heavy, or very rapidly revolving machinery the usual danger of shocks and strains due to sudden changes of speed are avoided, which is a very important matter in practice. A still further advantage is that in a clutch mechanism depending entirely upon friction the wear of the frictional contact parts is very great, while with my device much of this wear and consequent expense for renewal of parts is avoided.

What I claim as new and desire to secure by Letters Patent is:

1. In a power transmitting clutch, a clutch member C fixed to the driving shaft A, a sliding clutch member D on the driven shaft B, and operated by the shipper collar F and connecting rods f f, with a friction disk e fixed to the driving shaft A, a friction disk G sliding upon the driven shaft B, the disk H fixed to said driven shaft, two or more right angle levers J pivoted to said fixed disk H, and pivotally connected to the friction disk G by the links K and to the shipper collar F by the link L substantially as described and for the purposes set forth.

2. In a combined frictional and positive clutch a driving and a driven shaft, a clutch member fixed to said driving shaft, a sliding clutch member splined upon the driven shaft, said sliding member being connected by rods with a shipper collar adapted to slide on said driven shaft, in combination with a friction disk fixed to said driving shaft, a sliding friction disk splined upon said driven shaft, a flange fixed to said driven shaft and supporting two or more right angle levers pivoted thereto and pivotally connected with said sliding friction disk and to said shipper collar, substantially as described and for the purpose set forth.

RAYMOND H. DOLPH.

Witnesses:
AQUILA H. HULL,
ALFRED R. GRISWOLD.